J. R. McGUIRE.
VEHICLE PERCH-PLATE.
No. 172,643. Patented Jan. 25, 1876.
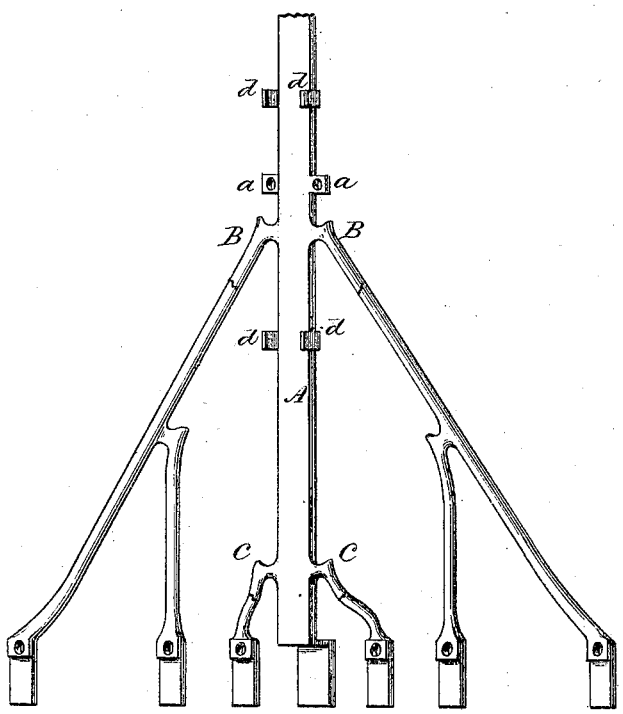

UNITED STATES PATENT OFFICE.

JOSEPH R. McGUIRE, OF ANSONIA, CONNECTICUT.

IMPROVEMENT IN VEHICLE-PERCH PLATES.

Specification forming part of Letters Patent No. 172,643, dated January 25, 1876; application filed October 19, 1875.

*To all whom it may concern:*

Be it known that I, JOSEPH R. MCGUIRE, of Ansonia, in the county of New Haven and State of Connecticut, have invented a new Improvement in Carriage-Perch Plates; and do hereby declare the following, when taken in connection with the accompanying drawings and the letters of reference marked thereon, to be a full, clear, and exact description of the same, and which said drawings constitute part of this specification, and represent a perspective view.

This invention relates to an improvement in the construction of that part of the running-gear of a carriage known as the "stays or perch-irons"—that is to say, the braces that extend from the perch to the rear axle. The usual method of constructing these parts of the running-gear has been to form the stay-ends upon a strap to be secured upon opposite sides of the perch by bolts through the perch. This necessarily weakens the perch, and also multiplies the number of parts, as these ends are made and furnished to the trade to be welded to the braces.

The object of this invention is to construct the perch-plate with the stay-ends attached, and so as to be attached to the perch without perforating it; and it consists in constructing the perch-plate with the stay-ends as a part of it, and with lugs upon the edges of the plate to embrace the wood perch, and with ears to receive the screw ends of the clip.

A represents the perch-plate, which is formed to extend the entire length of the perch upon the under side. At the points where it is desirable to bind the plate to the perch an ear, $a$, is formed upon each side, and perforated to receive the screw ends of the clip, and at intermediate points lugs $d$ are formed upon the edges, to embrace the perch and prevent transverse movement. The stay-ends B are formed and strapped on the plate as a part of it, as also the rear stay-ends C. The ends which are forged with the plate extend from the plate a short distance, as denoted by broken lines. The carriage-smith adds to the ends the length of brace required. By this construction the perch-plate and stay-ends are in one and the same piece, thereby avoiding the numerous pieces required in this part of carriage-ironing. They are located so that the proper position for the stay-end is not to be considered by the carriage-smith, the perforation of the perch is avoided, and much time and labor saved.

The drawing illustrates the rear part of the perch and stays complete; but it will be understood that the complete braces or stays may or may not be a part of the manufacture, it only being essential that the perch-plate be formed with the stay-ends as a part of it.

I claim—

The perch-plate constructed with the stay-ends as a part of it, and with the clip-ears and side-supporting lugs, substantially as described, as an article of manufacture.

JOSEPH R. McGUIRE.

Witnesses:
E. T. BARTLETT,
W. J. McGUIRE.